United States Patent
Gosalia (10) Patent No.: US 11,100,509 B2
(45) Date of Patent: Aug. 24, 2021

(54) AUTHENTICATION AND AUTHORIZATION WITH PHYSICAL CARDS

(71) Applicant: PAYPAL, INC., San Jose, CA (US)

(72) Inventor: Jigar Rajnikant Gosalia, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 56 days.

(21) Appl. No.: 16/431,652

(22) Filed: Jun. 4, 2019

(65) Prior Publication Data

US 2020/0387904 A1 Dec. 10, 2020

(51) Int. Cl.
*G06Q 20/40* (2012.01)
*H04W 12/06* (2021.01)
*H04L 29/06* (2006.01)
*H04L 9/32* (2006.01)
*G07C 9/29* (2020.01)

(52) U.S. Cl.
CPC ........... *G06Q 20/4016* (2013.01); *G07C 9/29* (2020.01); *H04L 9/3236* (2013.01); *H04L 63/0428* (2013.01); *H04L 63/0853* (2013.01); *H04W 12/06* (2013.01)

(58) Field of Classification Search
None
See application file for complete search history.

(56) References Cited

U.S. PATENT DOCUMENTS

| 2002/0035539 A1* | 3/2002 | O'Connell | G06Q 20/32 705/39 |
| 2003/0204725 A1* | 10/2003 | Itoi | G06Q 20/322 713/168 |
| 2012/0173431 A1* | 7/2012 | Ritchie | G06Q 20/385 705/65 |
| 2015/0312041 A1* | 10/2015 | Choi | H04L 63/0861 713/175 |
| 2016/0189154 A1* | 6/2016 | Eramian | G06Q 20/4014 705/44 |

OTHER PUBLICATIONS

F. K. Bhutta, A. Ghafoor and S. Sultan, "Smart phone based authentication and authorization protocol for SPACS," High Capacity Optical Networks and Emerging/Enabling Technologies, Istanbul, Turkey, 2012, pp. 127-131, doi: 10.1109/HONET.2012.6421448. (Year: 2012).*

* cited by examiner

*Primary Examiner* — Bennett M Sigmond
*Assistant Examiner* — Gregory S Cunningham, II
(74) *Attorney, Agent, or Firm* — Haynes and Boone, LLP (57) ABSTRACT

Systems and methods for authentication and authorization using physical computing cards include receiving from the physical computing card an authorization request, where the request includes a card identifier and an entity location. Authorized users associated with the card identifier are determined. Identifications of users with pending transactions at the entity location are obtained. Verification is performed by determining that there is a match between an identification of a user to an identification of one of the authorized users. The user is then authorized to access resources associated with the physical computing card.

20 Claims, 6 Drawing Sheets

AUTHENTICATION AND AUTHORIZATION WITH PHYSICAL CARDS

TECHNICAL FIELD

The present disclosure generally relates to security and more particularly to authentication and authorization utilizing physical computing cards according to various embodiments.

BACKGROUND

Authentication and/or authorization systems and methods allow users to access various resources (e.g., buildings, equipment, rooms, funds, credit, points, vehicles, electronic devices, device applications, services, and other resources). However, the technology related to prior systems and methods for authorization and authentication using physical cards is susceptible to identity theft and counterfeit activity. In prior systems and methods, when a person fraudulently takes possession of a physical card, the person may be able to access resources connected with that card. As an example, a person may steal a building access card and that person may use the building access card to fraudulently enter a building. As another example, a person may steal a credit/debit card and that person may use the credit/debit card to fraudulently make purchases at stores or on the Internet. Thus, there is a need for an improvement in the field of authentication and security and related technology involving physical cards to securely and efficiently provide users with access to resources while eliminating the possibility of fraudsters taking possession and fraudulently using such physical cards.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

The present disclosure describes systems and methods for authenticating and authorizing a user for access to one or more resources by utilizing a physical computing card. Resources may include buildings, equipment, rooms, funds, credit, reward points, vehicles, electronic devices, device applications, roads, services, and any other resource that may be associated and/or accessed with the physical computing card.

In some embodiments, a first user provides an authentication input to an input device to access one or more resources associated with, or secured by, a physical computing card. When the first user has been identified and authenticated, a second user may perform an action on the physical computing card from a different location. The action performed on the physical computing card authorizes users associated with the physical card to access the resource(s). The users associated with the physical card may be designated as "authorized users" of the physical card in an initial configuration and/or setup of the physical card. The identity of the first user is compared to the identities of the other users for the physical computing card to determine if there is a match. If the identity of the first user is determined to match an identity of an authorized user for the physical card, the first user is authorized to access the resources (as used herein, "resources" also include a single resource) associated with physical computing card. In some embodiments, the second user and the first user may be the same user.

In some embodiments, a first user may want to access resources associated with a physical computing card. The first user may provide an authentication input to an entity device at an entity location. The first user is identified based on the authentication input (e.g., authenticated). The first user may perform an action on a physical computing card associated with the resources. The action performed may be determined to match a predetermined action corresponding to an authorization grant for authorized users associated with the card to access the resources. A service provider may receive an identifier of the first user and the authorization grant from the physical computing card and determine that the identifier of the first user matches an identifier of an authorized user for the physical computing card. The service provider may send a transaction authorization to the entity device (e.g., communicated through an entity server) where the transaction authorization authorizes the first user to access to the resources. For example, the resources may be those described above. In some cases where the resources are services, the services may be insurance services, auto services, payment services, medical services, membership services, and other services. In some instances, services as described above may refer to an authentication service.

In another example, a user may want to access funds associated with a computing physical card. The user may be located at a POS device at a merchant location. The user may be involved in a pending transaction at the POS device. The user may provide an authentication input, such as a biometric or an alphanumeric identifier, such as a password or code, to the POS device to identify and authenticate herself/ himself. The user may then perform an action on the physical card, where the action performed on the physical card matches a predetermined action corresponding to authorizing "authorized users" associated with the physical computing card to access funds associated with the physical computing card. The identification of the user may match an identification of an authorized user associated with the physical computing card. The POS device may then receive instructions to conduct the pending transaction for the user as the first user has been authenticated and authorized for use of the funds to complete the transaction.

In another example, a first user may want to access funds associated with a physical computing card held by a second user. The first user and the second user may be shopping at a store (e.g., merchant location). The first user may be a child without any means to pay for a transaction at a POS device (e.g., merchant device) at the store (e.g., no paper money, no digital wallet, and/or no credit/debit cards). The second user may be a parent of the child and be a holder of the physical computing card. The child may have a pending transaction at the POS device, but is unable to proceed with paying for the transaction because he/she does not have any means to pay and the parent is not nearby (e.g., located at a different location within the store). The child may provide an authentication input to the POS device to identify himself/herself. Once the child has been identified, the parent, located elsewhere within the store, may perform an action on the physical computing card, which authorizes users associated with the physical computing card to access funds associated with the physical computing card for payment transactions. In some embodiments, the child is identified (e.g., authenticated), an authorization grant is received from the parent based on the action performed on the physical computing card, and the identity of the child is determined to match an identity of one of the authorized users associated with the physical computing card. The child is then authorized to access the funds associated with the physical computing card. When authentication of the child and authorization from the parent are successfully completed, the POS device receives the authorization grant and conducts the pending transaction for the child using the funds associated with the physical computing card.

In some embodiments, an authentication input may include a plurality of wireless environments, a plurality of detected touch inputs, a plurality of application use details, captured images, captured sounds, and determined locations. In another example, the user may use a user device to provide the authentication input to the input device. If the authentication input provided by the user matches a known authentication input of an authentication profile in a database for an entity, the user can be identified and authenticated. The identification of the user can then be used to further determine authorization for access to the one or more resources associated with the physical computing card.

In some embodiments, an authentication profile includes a wireless environment authentication profile that describes a plurality of wireless environments indicative of an authorized location for the user device and/or physical computing card, a touch input authentication profile that describes a plurality of touch inputs that are indicative of an authenticated user of the user device, an application-use authentication profile that describes a plurality of application use details that are indicative of a authenticated user for the user device, image profiles that include images of authenticated users, voice profiles that include voices of authenticated users, biometric profiles that include biometric data of authenticated users. For example, biometric data may include fingerprint, face recognition, DNA, palm print, hand geometry, iris recognition, retina, odor/scent, and/or palm vein data. In some embodiments, authorization as discussed herein may be performed based on matching between the authentication input and the authentication profile.

In some embodiments, the physical computing card receives an action performed on the physical computing card from a second user. In some cases, the second user may be the same as the first user. The physical computing card and/or a service provider may determine that the action corresponds to an authorization grant. The authorization grant may indicate that the second user has approved authorized users associated with the physical computing card to access resources associated with the physical computing card. The physical computing card may then send a request to a service provider associated with the physical computing card to identify one or more authorized users of the physical computing card. The service provider may send identifiers of the one or more authorized users of the physical computing card to the physical computing card and/or various other devices in the system. In some embodiments, the physical computing card receives the identifiers of the one or more authorized users of the physical computing card and sends the authorization grant and the identifiers of the authorized users to one or more devices in the system to authorize the first user that has an identifier matching one of the identifiers of the authorized users to proceed with an activity conducted through the one or more devices in the system (e.g., access resources associated with the physical computing card). For example, the activity may be a payment transaction for goods or services, in which case, the device may be a POS device for a merchant. In another example, activity may be access to a facility, and the device may be a security device that permits entry to the facility. As a further example, a person may be a gym member standing outside of a gym building and seeking access to the gym building through the aforementioned security device. Implementing the embodiments discussed herein, the user may be able to securely access the gym building while the gym building owner may be able to securely prevent non-members from entering the gym building.

Figure 1:
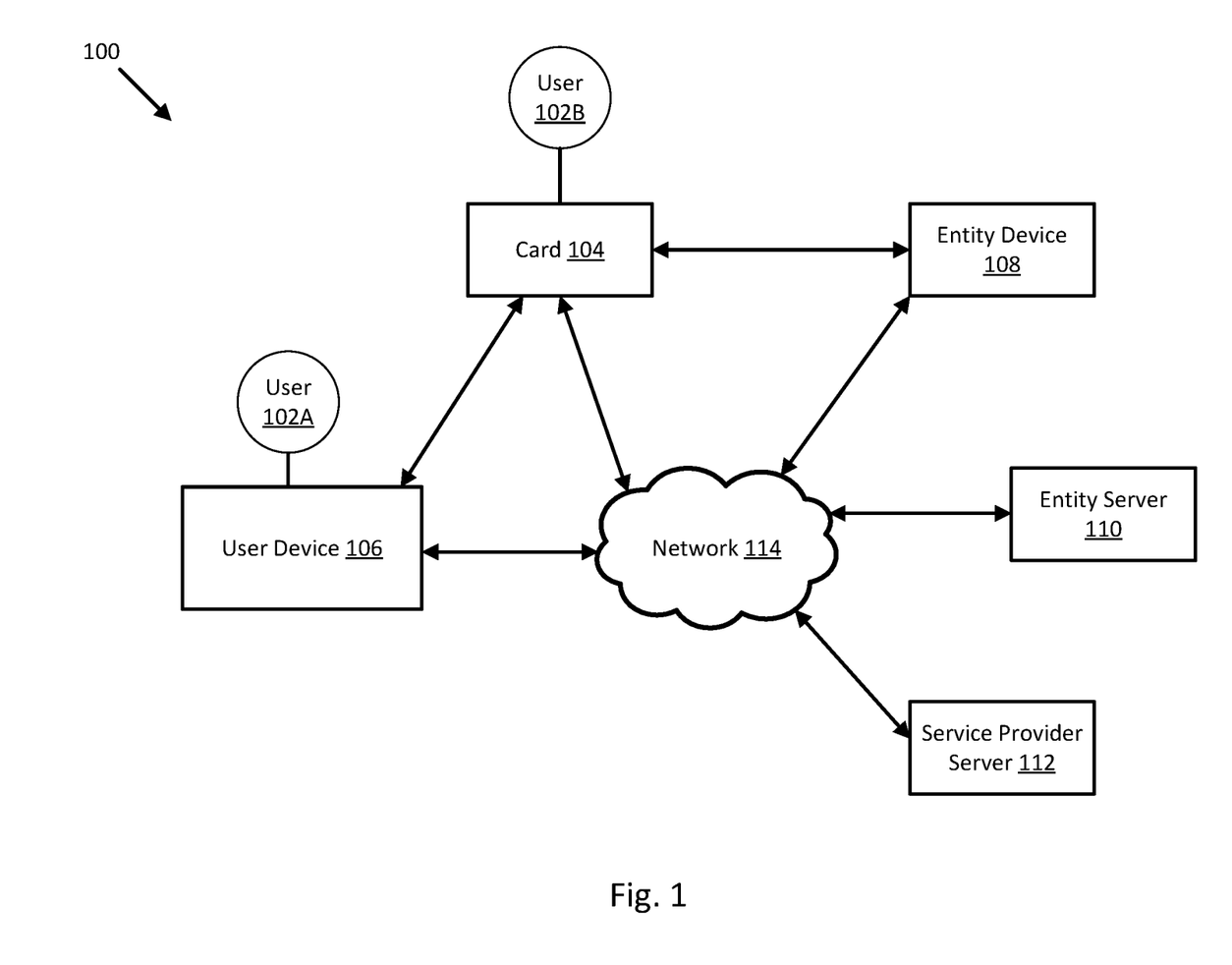
FIG. 1 illustrates a block diagram of a networked system suitable for implementing one or more embodiments of the present disclosure.

Referring now to FIG. 1, a block diagram of a networked system 100 configured to authenticate and authorize one or more users for access to resources using a physical computing card in accordance with one or more embodiments of the present disclosure is illustrated. System 100 includes a physical computing card 104, a user device 106, an entity device 108, an entity server 110, and a service provider server 112. Service provider server 112 may be maintained by a payment provider, such as PayPal, Inc. of San Jose, Calif. A user 102A is associated with user device 106, where user 102A can provide an authentication input to entity device 108 using user device 106. A user 102B is associated with physical computing card 104, where physical computing card 104 may receive an action performed on physical computing card 104 by user 102B. In some embodiments, one or more of the depicted components of system 100 may include a plurality of the depicted components.

Physical computing card 104, user device 106, entity device 108, entity server 110, and service provider server 112 may each include one or more processors, memories, and other appropriate components for executing instructions such as program code and/or data stored on one or more computer-readable mediums to implement the various applications, data, and steps described herein. For example, such instructions may be stored in one or more computer-readable media such as memories or data storage devices internal and/or external to various components of system 100, and/or accessible over a network 114. Each of the memories may be non-transitory memory.

Network 114 may be implemented as a single network or a combination of multiple networks. For example, in various embodiments, network 114 may include the Internet or one or more intranets, landline networks, and/or other appropriate types of networks.

User device 106 may be implemented using any appropriate hardware and software configured for wired and/or wireless communication over network 114. User device 106 may be implemented using any appropriate hardware and software configured for wired and/or wireless communication with physical computing card 104. User device 106 may be implemented using any appropriate hardware and software configured for wired and/or wireless communication with entity device 108. For example, in some embodiments, user device 106 may be implemented as a personal computer (PC), a mobile phone, personal digital assistant (PDA), laptop computer, and/or other types of computing devices capable of transmitting and/or receiving data, such as an iPhone™, Watch™, or iPad™ from Apple™.

User device 106 may include one or more browser applications which may be used, for example, to provide a convenient interface to facilitate browsing information available over network 114. For example, in one embodiment, the browser application may be implemented as a web browser configured to view information available over the internet. User device 106 may also include one or more toolbar applications which may be used, for example, to provide client-side processing for performing desired tasks in response to operations selected by user 102A. In one embodiment, the toolbar application may display a user interface in connection with the browser application.

User device 106 may further include other applications as may be desired in particular embodiments to provide desired features to user device 106. For example, the other applications may include an application interface between card 104 and the network 114, security applications for implementing client-side security features, programming client applications for interfacing with appropriate application programming interfaces (APIs) over network 114, or other types of applications. In some cases, the APIs may correspond to entity device 108, entity server 110, or service provider server 112. The applications may also include email, texting, voice, and instant messaging applications that allow user 102A to send and receive emails, calls, and texts through network 114, as well as applications that enable the user to communicate to service provider server 112 as discussed above. User device 106 includes one or more identifiers which may be implemented, for example, as operating system registry entries, cookies associated with the browser application, identifiers associated with hardware of user device 106, or other appropriate identifiers, such as those used for user, payment, device, location, and or time authentication. In some embodiments, a user identifier may be used by service provider server 112 to associate user 102A with a particular account maintained by the service provider server 112. A communications application with associated interfaces facilitates communication between user device 106 and other components within system 100, including NFC communications with physical computing card 104.

Physical computing card 104 may be in communication with various components of system 100 to communicate card information. In some embodiments, physical computing card 104 may communicate directly with service provider server 112, entity server 110, and/or entity device 108. In some embodiments, the physical computing card may communicate indirectly with service provider server 112, entity server 110, and/or entity device 108 through a proxy device. For example, the proxy device may be user device 106, and physical computing card 104 may communicate information in the same manner as described above in reference to user device 106. In some embodiments, the proxy device may be one or more beacon devices located at an entity location where the beacon(s) facilitate communication between card 104 and the various components of system 100. Note that other embodiments may use communication devices other than beacons that enable communications to be conducted as described herein. In other embodiments, the proxy device may be a smart watch, goggles, and/or Augmented Reality device, which may communicate with the physical computing card 104 through direct Line of Sight (LoS) communication or through an interconnection, triangulation or other wireless communication. Physical computing card 104 may be maintained, for example, by an entity that issues physical computing card 104 as an access card for resources as described above. In some cases, physical computing card 104 may be maintained, for example, by a bank that issues physical computing card 104 for payment over network 114. Physical computing card 104 may include a database storing information about physical computing card 104, such as authorized users, addresses, PINs, security codes, and other information. Physical computing card 104 may also include a communication application to facilitate communication with the various components of system 100 through network 114.

Service provider server 112 may be maintained, for example, by an online service provider which may provide authentication and authorization services. In some cases, service provider server 112 may be maintained, for example, by an online payment service provider which may provide payment services to user 102A and/or user 102B. In this regard, service provider server 112 includes one or more payment applications which may be configured to interact with user device 106 and/or physical computing card 104 over network 114 to facilitate the payment services, including authenticating and authorizing user 102A and/or user 102B to access resources associated with physical computing card 104.

Service provider server 112 maintains a plurality of user accounts, each of which may include account information associated with individual users. For example, account information may include a list (e.g., plurality) of authorized users and their respective identity tokens, private financial information of users such as account numbers, passwords, device identifiers, user names, addresses, phone numbers, credit card information, bank information, PINs, coupons, discounts, incentives, loyalty points, value items, or other financial information which may be used to facilitate an online transaction by user 102A and/or user 102B. Funding instruments, such as credit and debit cards, may also be stored within the account information or another part of service provider server 112. The payment application may be configured to interact with user 102A to make payments for the user. In some embodiments, service provider server 112 includes one or more servers.

Service provider server 112 includes an authorization application, which may be configured to receive information from user device 106 and/or physical computing card 104 for authenticating and/or authorizing user 102A and/or user 102B to access the resources associated with physical computing card 104. The authorization application may include one or more applications to process a request from user 102A and/or user 102B to authenticate and/or authorize a user as described herein. As such, the authorization application may store details of the authorization request.

Service provider server 112 may include an authorization database to store authorization details from completed authorization requests including transactions associated with the authorization requests. Such information may also be stored in a third-party database accessible by service provider server 112 and/or entity server 110.

Entity server 110 may be maintained, for example, by a merchant or a company which may provide goods, digital goods, services, and/or the resources discussed above. Entity server 110 may store information related to user accounts. For example, various users may be registered with entity server 110 to make authorization requests to access resources at an entity location associated with the entity server 110. Entity server 110 may store various account information associated with each user account. The account information may include private information of users such as account numbers, PINs/passwords, device identifiers, user names, phone numbers, and/or other information to identify users. The entity server 110 may include applications such as an authenticator configured to authenticate users. For example, entity device 108 may receive an authentication input which it sends to entity server 110. Entity server 110 may apply the authenticator to the authentication input to determine an identity for the user. Entity server 110 may also include a security application configured to encrypt and/or decrypt data to provide secured communication and transfer of data.

Entity device 108 may be maintained, for example, by a physical or online entity, offering various goods and/or services, and/or providing the resources as described above. Entity device 108 may include a database identifying available products, services, and/or resources which may be made available for viewing by the user. In an example, the user (e.g., user 102A and/or user 102B) may purchase the products and/or services and make an authorization request to access funds associated with physical computing card 104 to make the purchase. In an example, the user (e.g., user 102A and/or user 102B) may make an authorization request to access a facility, equipment, and/or other resources that are viewable or accessible through entity device 108.

In some cases, entity device 108 is a POS device. In this regard, entity device 108 may include a checkout application which may be configured to facilitate a purchase by a user. The checkout application may be configured to accept payment information associated with physical computing card 104 to process a transaction.

Figure 2:
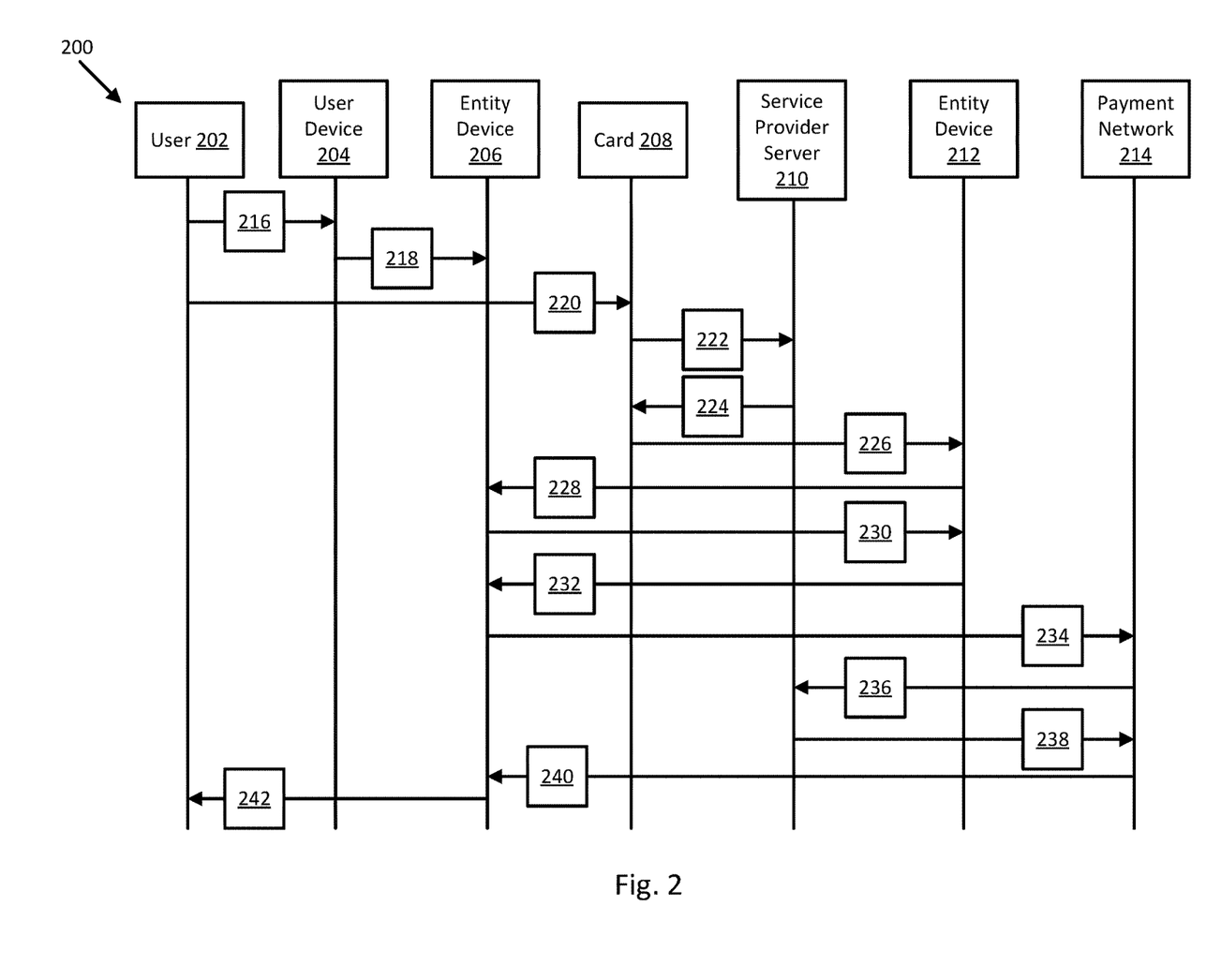
FIG. 2 illustrates a flow diagram of a process for authentication and authorization with a physical card in accordance with one or more embodiments of the present disclosure.

FIG. 2 illustrates a flow diagram of a process 200 for authentication and authorization with a physical computing card in accordance with one or more embodiments of the present disclosure. For explanatory purposes, process 200 is primarily described herein with reference to FIG. 1; however, the process 200 is not limited to FIG. 1. The blocks of process 200 are described herein as occurring in serial, or linearly (e.g., one after another). However, multiple blocks of process 200 may occur in parallel. In addition, the blocks of process 200 need not be performed in the order shown and/or one or more of the blocks of process 200 need not be performed.

Prior to use, physical computing card 208 and associated accounts may be established. For example, user 202 may go online to a website or to a physical location of a service provider associated with service provider server 210 to apply for and/or set up physical computing card 208 and its associated authorized accounts. User 202 may establish an account owner for the physical computing card 208 as well as authorized users for the physical computing card 208. The account owner may be an authorized user. An authentication profile may be established for each authorized user as discussed above, which may be used in various embodiments of the present disclosure to authenticate and/or authorize particular users during transactions using physical computing card 208. During account setup, the service provider may request information about the authorized users to establish an authentication profile for each authorized user.

In some embodiments, an authentication profile includes factors such as a wireless environment authentication profile that describes a plurality of wireless environments indicative of an authorized location for the user device and/or physical computing card, a touch input authentication profile that describes a plurality of touch inputs that are indicative of an authenticated user of the user device, an application-use authentication profile that describes a plurality of application use details that are indicative of a authenticated user for the user device, image profiles that include images of authenticated users, voice profiles that include voices of authenticated users, biometric profiles that include biometric data of authenticated users. For example, biometric data may include fingerprint, face recognition, DNA, palm print, hand geometry, iris recognition, retina, odor/scent, and/or palm vein data. In some embodiments, authorization as discussed herein may be performed based on matching between the authentication input and the authentication profile.

At block 216, a user 202 provides a touch input to a user device 204. The touch input may be used to authenticate user 202 for use of an application of user device 204. The application may be an authentication application for identifying user 202 and providing the identification to an entity device 206. The touch input may be a PIN/password and/or biometric information of user 202. The touch input may also include the user 202 selecting an authentication button in a graphical user interface of user device 204. In some cases, user device 204 may be, may include, or may be part of user device 106 of FIG. 1.

At block 218, user device 204 communicates a user identifier to entity device 206. For example, the user identifier may be a QR code, username, account number, phone number, email address, and/or another user identifier associated with user 202. In some cases, the user identifier may be an encrypted identity token associated with user 202 that user device 204 establishes through an authentication application of user device 204. In some cases, the user identifier may be a hashed identity token for user 202 that user device 204 establishes through an authentication application of user device 204. Entity device 206 receives the user identifier. For example, entity device 206 may be located at an entity location. Once entity device 206 has received the user identifier, entity device 206 determines that user 202 is involved in a pending transaction.

In some cases, the transaction may be a payment transaction for goods or services, in which case, entity device 206 may be a POS device for a merchant at a merchant location. In some cases, the transaction may be a request to access resources as discussed above. For example, user 202 may wish to access a facility at an entity location, and user 202 is involved in a pending transaction at entity device 206 to access the facility. As a further example, user 202 may be a gym member standing outside of a gym building. User 202 may be requesting access to the gym building at a gym device at the door of the gym building.

At block 220, user 202 performs an action on a physical computing card 208. In some embodiments, physical computing card 208 may be, may include, or may be part of physical computing card 104 of FIG. 1. In some embodiments, physical computing card 208 determines that the action performed on the card matches a predetermined action corresponding to an authorization grant. In other embodiments, physical computing card 208 sends data related to the action performed on the card to service provider server 210, and service provider server 210 determines that the action performed on the card matches a predetermined action corresponding to an authorization grant. In other embodiments, physical computing card 208 sends data related to the action performed on the card to entity device 212, and entity device 212 determines that the action performed on the card matches a predetermined action corresponding to an authorization grant.

In some embodiments, the action performed on physical computing card 208 may be one or more physical touches detected by a sensor device of physical computing card 208. The one or more physical touches may include, for example, swipes, pinches, taps, holds, and/or clockwise/counterclockwise finger movement. The one or more physical touches may be a series of touches in some cases. The series of touches may form a pattern. The touches may be for a duration of time and/or at certain pressures. Each of the above actions performed on the card may be combined in various ways to form an aggregated action on the physical computing card 208.

At block 222, physical computing card 208 sends an authorization request to a service provider server 210. Service provider server 210 receives the authorization request at block 222. In some embodiments, the authorization request includes a request for one or more identifiers corresponding to one or more authorized users associated with physical computing card 208. In some cases, the authorization request includes a request for encrypted and/or hashed identity tokens of each of the authorized users associated with physical computing card 208. In some cases, service provider server 210 may be, may include, or may be part of service provider server 112 of FIG. 1.

At block 224, service provider server 210 sends to physical computing card 208 one or more identifiers corresponding to one or more authorized users associated with physical computing card 208. In some embodiments, the one more identifiers corresponding to the one or more authorized users associated with physical computing card 208 are encrypted and/or hashed identity tokens. At block 224, physical computing card 208 receives the one or more identifiers corresponding to one or more authorized users associated with physical computing card 208.

At block 226, physical computing card 208 sends the authorization grant and the one or more identifiers corresponding to one or more authorized users associated with the card to an entity device 212. Entity device 212 is configured to communicate with entity device 206. The authorization grant authorizes any of the one or more authorized users associated with card 208 to access resources associated with card 208. In some cases, the resources facilitate an activity conducted through entity device 206. For example, as discussed above, the activity at entity device 206 may be the pending transaction discussed at block 218.

In some embodiments, entity device 212 receives the authorization grant and the one or more identifiers corresponding to the one or more authorized users associated with the card and processes such for broadcasting. In some cases, entity device 212 is a beacon. For example, the beacon may include a plurality of beacons located throughout an entity location. In other cases, entity device 212 is a router or modem or other local or long-range communication device(s) that enable communications as described herein.

At block 228, entity device 212 communicates (e.g., sends, broadcasts) a request to entity device 206, and entity device 206 receives the request from entity device 212. The request at block 228 may include a query asking if entity device 206 has a pending transaction involving a user whose user identifier matches an identifier of one of the authorized users associated with physical computing card 208. In some embodiments, entity device 206 determines (e.g., or verifies) whether the user identifier determined at block 218 matches an identifier of the one or more authorized users.

At block 230, in response to determining and/or verifying that the user identifier from block 218 in the pending transaction matches an identifier of the one or more authorized users, entity device 206 sends a response to entity device 212. The response may be an affirmation that entity device 206 has a pending transaction involving a user associated with a user identifier that matches an identifier of the one or more authorized users. Entity device 212 receives the response from entity device 206 and processes such to provide further approval or denial of authorization.

At block 232, in response to receiving the affirmation from entity device 206, entity device 212 sends an authorization to entity device 206. The authorization may be received by entity device 206. The authorization authorizes user 202 to access resources associated with physical computing card 208, where based on the authorization, entity device 206 may conduct the pending transaction for the user.

At block 234, entity device 206 sends transaction information to a payment network 214. In some embodiments, the transaction information may include transaction details, the user identifier, and/or location data for the entity, entity devices 206 and 212, and/or user device 204.

At block 236, payment network 214 verifies the transaction information with service provider server 210. In some embodiments, payment, network 214 sends a verification request to a service provider server 210. The verification request may include the transaction information received at block 234. Service provider server 210 may verify that the transaction information and process an affirmation to be sent to payment network 214.

At block 238, service provider server 210 sends the affirmation to payment network 214, where the affirmation indicates that the transaction information has been successfully verified. Payment network 214 receives the affirmation indicating successful verification. Payment network 214 may process the transaction. In some embodiments, payment network 214 provides connectivity between a card issuer and an entity. In some embodiments, the card issuer may be a financial institution and the entity may be a merchant.

At block 240, payment network 214 sends a confirmation for the transaction to entity device 206 indicating successful completion of authentication and/or authorization. At block 242, entity device 206 may provide an indication of successful authentication and/or authorization to the user. For example, the indication may be a receipt for a purchase of goods or services. The indication may be displayed on entity device 206, where the indication may a successful authorization message. In some cases, the indication may be a lock to a door unlocking for the user, a door opening to provide access for the user, or power to equipment or a vehicle turning on.

Figure 3:
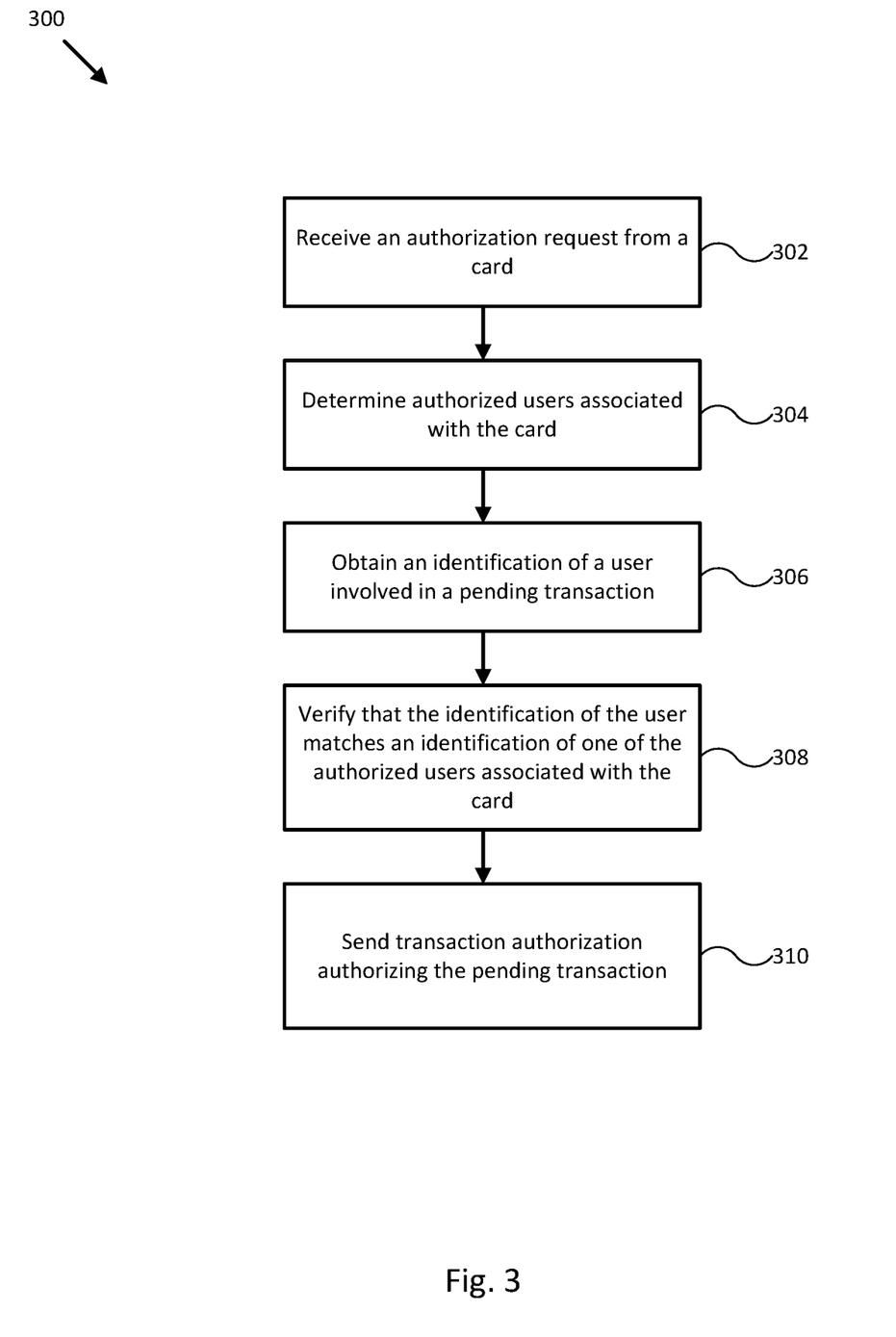
FIG. 3 illustrates a flow diagram of a process for authenticating and authorizing a user for access to resources in accordance with one or more embodiments of the present disclosure.

FIG. 3 illustrates a flow diagram of a process 300 for authenticating and authorizing a user for access to resources associated with a physical computing card. At block 302, an authorization request from the physical computing card is received by a first server. The authorization request may include a card identifier and an entity location.

At block 304, authorized users associated with the physical computing card are determined by the first server. For example, a user profile associated with the card may include a list of one or more authorized users authorized to access resources associated with the card. In this regard, the physical computing card and associated accounts may be established prior to operation of the physical computing card. For example, a user may go online to a website or physical location of a service provider for the physical computing card to apply for and/or set up the physical computing card 208. The user may establish an account owner for the physical computing card as well as authorized users for the physical computing card. The account owner and authorized users may establish authentication profiles as discussed above, which may be used in various embodiments of the present disclosure to authenticate and authorize particular users for transactions using the physical computing card. For example, a parent may establish an ownership account for the physical computing card and establish his/her spouse and children as authorized users for the physical computing card.

In some embodiments, the service provider may request different factors of an authentication profile to establish an authentication profile for each user. In some embodiments, the authentication profile includes factors such as a wireless environment authentication profile that describes a plurality of wireless environments indicative of an authorized location for the user device and/or physical computing card, a touch input authentication profile that describes a plurality of touch inputs that are indicative of an authenticated user of the user device, an application-use authentication profile that describes a plurality of application use details that are indicative of a authenticated user for the user device, image profiles that include images of authenticated users, voice profiles that include voices of authenticated users, biometric profiles that include biometric data of authenticated users. For example, biometric data may include fingerprint, face recognition, DNA, palm print, hand geometry, iris recognition, retina, odor/scent, and/or palm veins. In some embodiments, authorization as discussed herein may be performed based on matching between the authentication input and the authentication profile.

At block 306, the first server obtains an identification of a user involved in a pending transaction from a second server associated with a device involved in the pending transaction. The identification may be a QR code, username, account number, phone number, email address, device identifier, and/or any other user identifier associated with the user. In some cases, the identifier may be an encrypted identity token for the user. In some cases, the identifier may be a hashed identity token for the user. In some embodiments, the identification includes a wireless environment authentication profile that describes a plurality of wireless environments indicative of a location for the user device and/or physical computing card, a touch input authentication profile that describes a plurality of touch inputs that are indicative of an authenticated user of a user device (e.g. proxy device), an application-use authentication profile that describes a plurality of application use details that are indicative of a authenticated user for the user device, image profiles that include images of authenticated users, voice profiles that include voices of authenticated users, biometric profiles that include biometric data of authenticated users. For example, biometric data may include fingerprint, face recognition, DNA, palm print, hand geometry, iris recognition, retina, odor/scent, and/or palm veins. In some embodiments, verification as discussed with respect to process 300 may be performed based on matching between the identification of the user to an identification of an authorized user for the physical computing card.

At block 308, the first server performs verification to determine whether the identification of the user matches an identification of one of the authorized users associated with the card. For example, the identification may include a wireless environment profile, and verification may be performed by matching the wireless environment of the user device (e.g. proxy device) and/or physical computing card to a wireless environment indicative of an authorized location for an authorized user of the physical computing card. In another example, the identification may include a touch input provided by the user at a device location and the touch input may be processed to verify if it matches a security touch input of an authentication profile of an authorized user. In another example, the identification may include an application-use authentication profile that describes a plurality of application use details of the user, which may be processed to verify that such an application-use authentication profile of the user matches or is indicative of an authorized user for the physical computing card. In another example, the identification may include an image profile that include images associated with the user (e.g., QR codes, images of the user, and/or security images unique to the user) that may be processed to determine that they match an image profile of an authorized user of the physical computing card. In yet another example, the identification may include a voice profile of the user which may be processed to verify that it matches a voice profile of an authorized user of the physical computing card. In yet another example, the identification may include biometric data such as fingerprint data, face recognition data, DNA, palm print data, hand geometry, iris recognition data, retina data, odor/scent data, and/or palm veins information that may be compared to biometric data of authorized users of the physical computing card to verify that the user is an authorized user. In some embodiments, authorization as discussed herein may be performed by determining if there is a match between the authentication input and the authentication profile for any of the authorized user. In some embodiments, if no match is found, the user seeking access to the resources of the physical computing card is denied access.

At block 310, the first server sends a transaction authorization to the second server. The transaction authorization authorizes the user to access the resources associated with the card such that the device associated with the second server may conduct the pending transaction discussed at block 306. For example, the pending transaction may be a payment transaction for goods or services, in which case, a POS device for a merchant may receive instructions to conduct the pending transaction for the user using funds and/or credit associated with the physical computing card. In another example, the pending transaction may be a request for access to a facility. As a further example, a person may be a gym member standing outside of a gym building and seeking access to the gym building. The gym member may perform an action on the physical computing card and provide an identification to a security device located at the entrance of the gym building, and process 300 will commence to provide (or deny) access to the user to enter the gym building. In other examples, process 300 may be implemented to provide or deny access to a user for various other resources as discussed herein.

In some embodiments, the first server may be a service provider server. The second sever may be an entity server. The device may be an entity device. The entity server may be a merchant server and the device may be a POS device in some cases.

Figure 4:
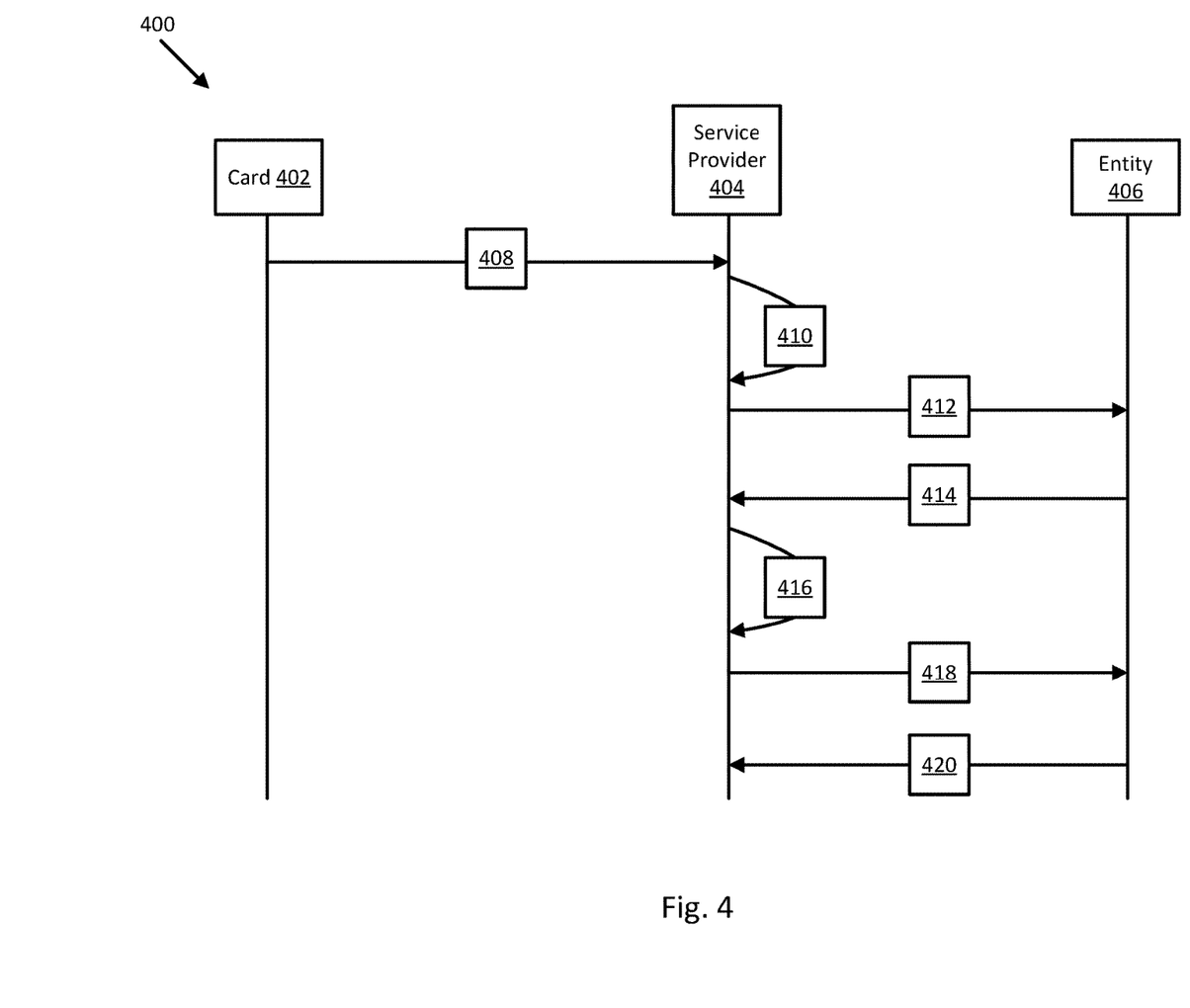
FIG. 4 illustrates is a flow diagram of a process for authentication and authorization with a physical card in accordance with one or more embodiments of the present disclosure.

FIG. 4 illustrates a flow diagram of a process 400 for authentication and authorization with a physical computing card in accordance with one or more embodiments of the present disclosure. For explanatory purposes, process 400 is primarily described herein with reference to FIG. 1; however, the process 400 is not limited to FIG. 1. Portions of the description of components and/or steps described by reference to FIGS. 2 and 3 may generally be applied to FIG. 4. The blocks of process 400 are described herein as occurring in serial, or linearly (e.g., one after another). However, multiple blocks of process 400 may occur in parallel. In addition, the blocks of process 400 need not be performed in the order shown and/or one or more of the blocks of process 400 need not be performed. For example, service provider 404 may be service provider server 112 of FIG. 1, entity 406 may be entity server 110, and/or card 402 may be card 104.

At block 408, a service provider 404 receives, over a network connection, from a physical computing card 402 an authorization request. The authorization request may include a card identifier, an entity location, an action performed on physical computing card 402, and/or an expiration time. The authorization request may be encrypted by card 402 and/or a proxy device for physical computing card 402. Service provider 404 may decrypt the encrypted authorization request after receiving the authorization request. The proxy device may send the authorization request to service provider 404 on behalf of physical computing card 402 in some embodiments. For example, the proxy device may be user device 106 of FIG. 1. In some embodiments, service provider 404 may be, may include, or may be part of one or more servers.

At block 410, service provider 404 determines one or more authorized users associated with the card identifier. In some embodiments, the card identifier may be used to access a card profile stored in a database associated with service provider 404. In some embodiments, the card identifier may be provided to an API associated with a card issuer server associated with physical computing card 402 to determine the one or more authorized users associated with the card identifier. The card profile may include a plurality of authorized users associated with the physical computing card 402. In one case, the plurality of authorized users and their associated identifiers are established during an account setup for the physical computing card 402.

At block 412, service provider 404 requests from an entity 406 an identification of user(s) involved in a pending transaction(s) at an entity device(s) located at an entity location. In some embodiments, entity 406 may be part of or may include one or more servers.

At block 414, service provider 404 obtains from entity 406 an identification of a user involved in a pending transaction at the entity device located at the entity location. In some embodiments, service provider 404 obtains the identification from entity 406 over a network (e.g., network 114 of FIG. 1). The identification may be a QR code, username, account number, phone number, email address, device identifier, and/or any other user identifier associated with the user. In some cases, the identifier may be an encrypted identity token for the user. In some cases, the identifier may be a hashed identity token for the user. In some embodiments, the identification includes a wireless environment authentication profile that describes a plurality of wireless environments indicative of a location for the user device and/or physical computing card, a touch input authentication profile that describes a plurality of touch inputs that are indicative of an authenticated user of a user device (e.g. proxy device), an application-use authentication profile that describes a plurality of application use details that are indicative of a authenticated user for the user device, image profiles that include images of authenticated users, voice profiles that include voices of authenticated users, biometric profiles that include biometric data of authenticated users. For example, biometric data may include fingerprint, face recognition, DNA, palm print, hand geometry, iris recognition, retina, odor/scent, and/or palm veins. In some embodiments, verification as discussed with respect to process 300 may be performed based on matching between the identification of the user to an identification of an authorized user for the physical computing card.

At block 416, service provider 404 verifies that the identification of the user obtained from entity 406 at block 414 matches an identification of the one or more authorized users associated with the card identifier. In some embodiments, service provider 404 may verify by comparing a hash value of the identification of the user to a hash value of the identification the one or more authorized users associated with the card identifier to determine that the respective hash values match. In some embodiments, service provider 404 may verify, that the identification of the user obtained from entity 406 at block 414 matches an identification of the one or more authorized users associated with the card identifier via an API associated with the card issuer server.

In some embodiments, verification may be performed by comparing the wireless environment of the user device (e.g. proxy device) and/or physical computing card 402 to a wireless environment indicative of an authorized location for an authorized user of the physical computing card 402. In another example, the identification may include a touch input to the user device at a device location and the touch input and/or device location may be processed to determine if it matches a security touch input and/or secure device location of an authentication profile of an authorized user associated with the physical computing card 402. In another example, the verification may be performed by comparing an application-use authentication profile that describes a plurality of application use details of the user, which may be processed to determine that such an application-use authentication profile of the user matches or is indicative of an authorized user for the physical computing card. In another example, the identification may include an image profile that include images associated with the user (e.g., QR codes, images of the user, and/or security images unique to the user) that may be processed to determine/verify that they match an image profile of an authorized user of the physical computing card 402. In yet another example, the verification may be performed by comparing a voice profile included in the identification to determine if it matches a voice profile of an authorized user of the physical computing card 402. In yet another example, the identification may include biometric data such as fingerprint data, face recognition data, DNA, palm print data, hand geometry, iris recognition data, retina data, odor/scent data, and/or palm veins information, which may be compared to biometric data of authorized users of the physical computing card 402 to verify that the user is an authorized user.

At block 418, in response to the verifying at block 416, service provider 404 sends, over the network connection, a transaction authorization to entity 406. The transaction authorization authorizes the entity device to conduct the pending transaction for the user as the user has been authorized to access the resources associated with physical computing card 402. Entity 406 may then communicate the transaction authorization to the entity device such that the entity device may conduct the pending transaction for the user. In some embodiments, at block 418, entity 406 may be a merchant, the merchant communicates with a payment network, and the payment network communicates with a card issuer to facilitate processing of the transaction.

For example, the entity device may be a POS device at a merchant location and the entity may be a merchant. The transaction authorization may authorize a POS device to conduct the pending transaction for the user using funds associated with physical computing card 402.

In another example, the entity device may be a security device at an entity location. The transaction authorization may authorize the security device to allow the user to access resources secured by the security device. For example, the security device may unlock a door of a building, start a vehicle, and/or open a gate.

In some embodiments, service provider 404 determines whether the expiration time included in the authorization request has lapsed. Sending the transaction authorization to entity 406 may be performed further in response to determining that the expiration time has not lapsed. For example, the authorization request may include a predetermined time period established during an account setup for the physical computing card 402. For explanatory purposes, the predetermined time period may be fifteen minutes, and as such, pending transaction(s) initiated within the next fifteen minutes following the time of the authentication request may be authorized using the various embodiments described herein. In some embodiments, service provider 404 determines whether the pending transaction(s) were initiated within a predetermined time period prior to the authentication request. For example, if the predetermined time period is fifteen minutes, pending transaction(s) initiated within the last fifteen minutes prior to the time of authentication request may be authorized using the various embodiments described herein. The predetermined time period may be established and adjusted according to physical computing card's 402 account owner's preferences. In some embodiments, an action performed on physical computing card 402 may adjust or establish the predetermined time period. For example, a duration of a touch on physical computing card 402 may correspond to a duration of the predetermined time period. To illustrate this example, a cardholder may apply a touch input to physical computing card 402 for fifteen seconds, which may correspond to authorization for a pending transaction that occurs within the next fifteen minutes. To further illustrate this example, a parent and child may walk into a retail store and upon walking into the store, the parent may provide a 15 second touch input to physical computing card 402 to authorize the child, who is an authorized user of the physical computing card 402, to conduct a transaction at the retail store in accordance with various embodiments of the present disclosure.

In some embodiments, service provider 404 determines that the action performed on physical computing card 402 matches a predetermined action corresponding to the transaction authorization. For example, the action performed on the card may be one or more physical touches detected by a sensor device of physical computing card 402, such as pinches, taps, holds, and/or clockwise or counterclockwise finger movement on physical computing card 402. For example, the one or more physical touches may be a series of touches matching a predetermined series of touches. The series of touches may form a pattern that is determined to match a predetermined pattern. The pinches, taps, and/or holds may be for a measured duration of time and/or force that may be compared to and matched to predetermined time durations and/or force pressures for the touches. Each of the above actions performed on physical computing card 402 may be combined in various ways to form an aggregated action on physical computing card 402 that may then be compared to the predetermined actions.

In some embodiments, service provider 404 determines a budget restriction for the pending transaction based on the action performed on physical computing card 402. In such embodiments, the pending transaction may be for a sale of goods or services. Each authorized user may have a predetermined budget restriction established during an account setup for physical computing card 402. If the authorized user makes an authorization request, the action performed on the card may automatically cause a budget restriction to apply to the pending transaction for that particular authorized user. In other examples, levels of budget restrictions are determined ad hoc based on the particular action performed on the physical computing card 402. As an example, each of the above described actions performed on physical computing card 402 may correspond to a budget restriction level for the pending transaction.

For example, in one case, a parent may perform a counterclockwise finger rotation on the physical computing card 402 to set a budget restriction level of twenty dollars for her child at a store, where the child is an authorized user of the physical computing card 402. The transaction authorization may include the budget restriction, thus in such a case, the child is restricted to transactions of twenty dollars or less.

In another example, the budget restriction may vary depending on the type of transaction. The type of transaction may be a transaction for goods at a retail store in one case. The type of transaction may be a transaction for services, such as vehicle repair services, in another case. In some embodiments, the budget restriction may be adjusted by an account owner for physical computing card 402 based on one or more actions performed on the physical computing card 402.

At block 420, entity 406 sends transaction information to service provider 404. The transaction information sent to service provider 404 may include an indication as to whether the pending transaction at the entity device was completed. The transaction information may include transaction details regarding goods and/or services, and price information if the pending transaction is a purchase and sale of the goods or services. The transaction details may include an indication as to whether the user was successfully permitted access to a building, room, equipment, vehicle, process transaction, payment, or other resource associated with the card.

In some embodiments, physical computing card 402 may perform several operations of the various blocks of FIG. 4. For example, in some embodiments, physical computing card 402 receives one or more touches from a sensor of physical computing card 402, determines that the one or more touches corresponds to an authorization grant, sends a request to a server associated with physical computing card 402 to identify a plurality of authorized users of physical computing card 402, receives identifiers of the plurality of authorized users of physical computing card 402 from the server, and sends the authorization grant and the plurality of authorized users to a first device configured to communicate with a second device located at an entity location. The authorization grant may authorize the plurality of authorized users to proceed with an activity conducted through the second device. In some cases, the entity location may be a merchant location, the first device may be a beacon located at the merchant location, and the second device may be a POS device of the merchant.

Thus, using various embodiments of the present disclosure, a fraudster is not able to take possession of a physical card and fraudulently use the physical card as the fraudster may have been able to do in prior techniques involving of physical cards. For example, if a fraudster takes possession of a physical card described herein, the fraudster will be unable to use the card because the fraudster will not have a user identification that matches an identification of an authorized user for the physical card. As such, embodiments discussed herein provide an improvement in the technical field of authentication and authorization and particularly to technology involving physical cards for greater security.

Figure 5:
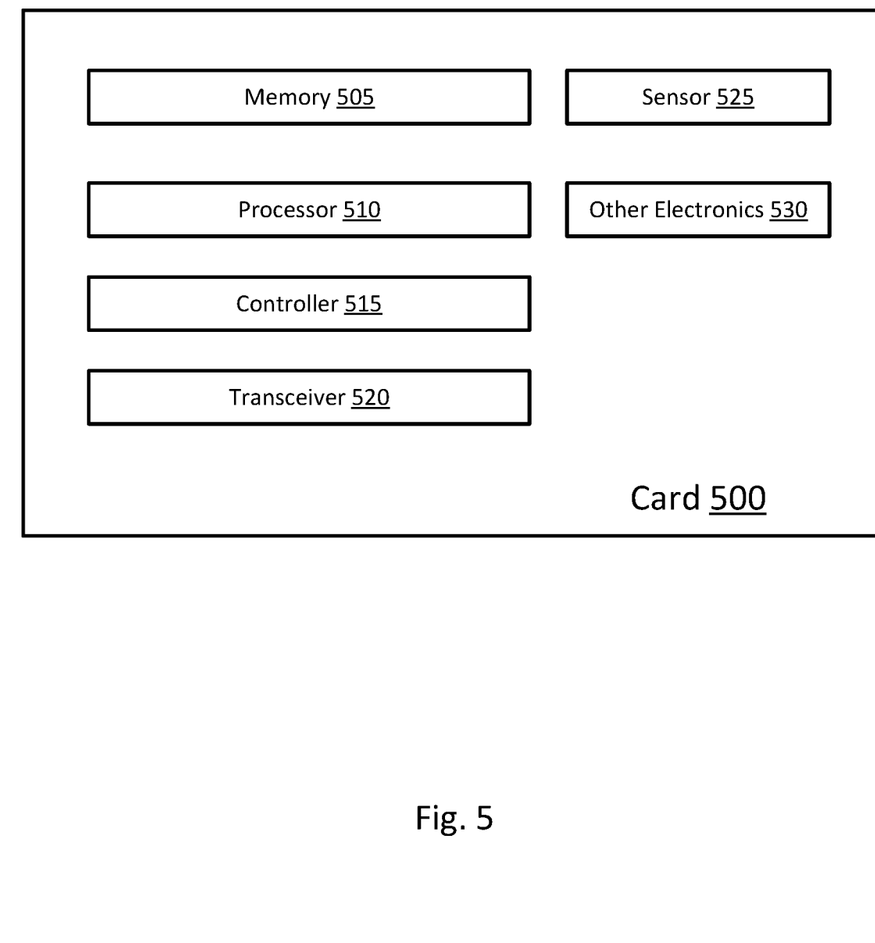
FIG. 5 illustrates a block diagram of a card in accordance with one or more embodiments of the present disclosure.

FIG. 5 illustrates a block diagram of a physical computing card 500 in accordance with one or more embodiments of the present disclosure. Physical computing card 500 includes a memory 505, a processor 510, a controller 515, a transceiver 520, a sensor 525, and other electronics 530. In some embodiments, card 500 may be, may include, or may be part of physical computing card 104, 208, or 402 of FIG. 1, 2, or 4, respectively.

Controller 515 may facilitate communicating information data, signals, and information between various components of card 500. Sensor 525 detects actions performed on physical computing card 500, such as those discussed above by reference to FIGS. 2-4. For example, sensor 525 may include one or more of temperature, touch, and/or pressure sensors. Transceiver 520 may further include NFC communication capabilities, such as an NFC reader to allow NFC communication with other devices such as user devices, entity devices, and/or beacons. Transceiver 520 may transmit and receive signals between physical computing card 500 and other devices, such as a user device, an entity server, and/or a service provider server via a network, e.g., network 114 of FIG. 1. In some embodiments, the transmission is wireless, although other transmission mediums and methods may also be suitable. Processor 510, which can be a microcontroller, digital signal processor (DSP), or other processing component, processes these various signals, such as for transmission to other devices via a communication link. Processor 510 or controller 515 may control transmission of information between physical computing card 500 and other devices. In some embodiments, physical computing card 500 may communicate with a user device, e.g., user device 106 of FIG. 1, to determine a geo-location for physical computing card 500. The geo-location may be provided by a Global Positioning System (GPS) device of the user device and transmitted to the card for storage in memory 505. The geo-location matching may be used as a factor for verification of transactions between various devices and servers (e.g. of system 100). For example, a service provider may verify a transaction if the geo-location for physical computing card 500 matches a known geo-location for an entity or merchant.

Physical computing card 500 performs specific operations by processor 510, controller 515, and/or other electronics 530 by executing one or more sequences of instructions contained in memory 505. Logic may be encoded in a computer-readable medium, which may refer to any medium that participates in providing instructions to processor 510 and/or controller 515 for execution. Such a medium may take many forms, including but not limited to, non-volatile media, volatile media, and transmission media. In various implementations, non-volatile media includes optical or magnetic disks, volatile media includes dynamic memory, such as memory 505, and transmission media includes coaxial cables, copper wire, and fiber optics, including wires coupling the various components of physical computing card 500. In one embodiment, the logic is encoded in non-transitory computer readable medium. In one example, transmission media may take the form of acoustic or light waves, such as those generated during radio wave, optical, and infrared data communications.

In some embodiments, other electronics 530 may include one or more indicator devices. For example, an indicator device may be a light-emitting diode (LED) indicator that changes color depending on various details of a transaction. For example, if the transaction is a purchase transaction, the LED indicator may change color based on the amount of the transaction exceeding a predetermined threshold. For example, if the transaction amount exceeds 30 dollars, the LED indicator may change from a first (e.g., green) color to a second (e.g., red) color. In some embodiments, when the LED indicator indicates that the transaction exceeds a predetermined threshold, an action may be performed on physical computing card 500 to deny authorization for a user to access the resources associated with physical computing card 500. In some embodiments, an indicator device may be a vibration device. The vibration device may be configured to provide a vibration pattern based on various details of a transaction. For example, the vibration device may provide a vibration pattern indicating that a user is awaiting approval for authorization to access resources associated with physical computing card 500. For example, the vibration device may provide a vibration pattern indicating that a transaction amount exceeds a predetermined threshold for a transaction. In an aspect, the predetermined threshold may be a budget restriction. In some embodiments, other electronics 530 may include a battery for physical computing card 500.

Figure 6:
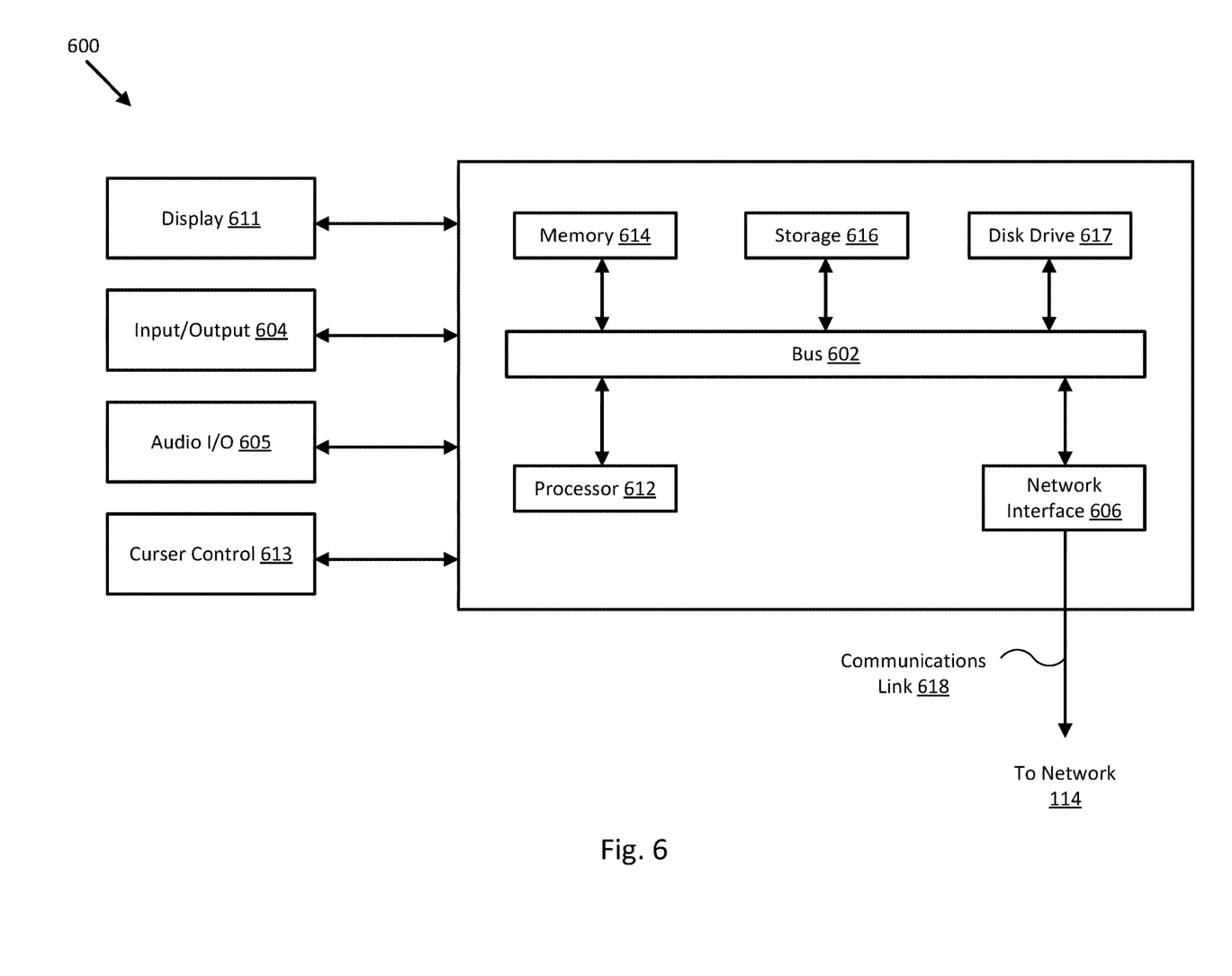
FIG. 6 illustrates a block diagram of a computer system in accordance with one or more embodiments of the present disclosure.

FIG. 6 illustrates a block diagram of a computer system 600 suitable for implementing one or more embodiments of the present disclosure. In various implementations, a user device may comprise a personal computing device (e.g., a personal computer, laptop, smart phone, PDA, Bluetooth device, key FOB, badge, etc.) capable of communicating with the network. The entity and service provider discussed in reference to FIG. 4 may utilize a network computing device (e.g., a network server) capable of communicating with the network 114 of FIG. 1. It should be appreciated that each of the devices utilized by users, entities, and service providers, and payment networks discussed herein may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component, such as a display 611 and a cursor control 613 (such as a keyboard, keypad, mouse, etc.). I/O component 604 may further include NFC communication capabilities, such as an NFC reader to allow NFC communication with other devices and/or physical cards as discussed herein. An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another user device, an entity server, and/or a provider server via network 114. In one embodiment, the transmission is wireless, although other transmission mediums and methods may also be suitable. Processor 612, which may be one or more hardware processors, can be a micro-controller, digital signal processor (DSP), or other processing component, processes these various signals, such as for display on computer system 600 or transmission to other devices via a communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer-readable medium, which may refer to any medium that participates in providing instructions to processor 612 for execution. Such a medium may take many forms, including but not limited to, non-volatile media, volatile media, and transmission media. In various implementations, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system, comprising:
   a non-transitory memory; and
   one or more hardware processors coupled to the non-transitory memory and configured to read instructions from the non-transitory memory to cause the system to perform operations comprising:
   receiving, over a network connection, from a physical computing card an authorization request, wherein the authorization request includes a card identifier and a location from which the authorization request was sent;
   determining one or more authorized users associated with the card identifier;
   obtaining from a server associated with a point-of-sale device a code scanned from a screen of a user device of a user involved in a pending transaction with the point-of-sale device;
   based on the code scanned from the screen of the user device and obtained from the server associated with the point-of-sale device, determining an identification of the user;
   verifying that the identification of the user matches an identification of the one or more authorized users associated with the card identifier;
   verifying that there is a match between the location from which the authorization request was received from the physical computing card and a location of the point-of-sale device where the code was scanned from the screen of the user device; and
   in response to the verifying that the identification of the user matches the identification of the one or more authorized users associated with the card identifier and the verifying that there is a match between the location from which the authorization request was received from the physical computing card and the location of the point-of-sale device where the code was scanned from the screen of the user device, sending, over the network connection, a transaction authorization to the server, wherein the transaction authorization authorizes the point-of-sale device to conduct the pending transaction for the user.

2. The system of claim 1, wherein the authorization request includes an expiration time, and wherein the operations further comprise:
   determining that the expiration time has not lapsed, wherein the sending the transaction authorization to the server is performed further in response to the determining that the expiration time has not lapsed.

3. The system of claim 1, wherein the authorization request includes an action performed on the physical computing card, and wherein the operations further comprise:
   determining a budget restriction for the pending transaction based on the action, wherein the transaction authorization includes the budget restriction.

4. The system of claim 1, wherein the authorization request is encrypted, and wherein the operations further comprise:
   decrypting the authorization request after the receiving.

5. The system of claim 1, wherein the verifying that the identification of the user matches an identification of the one or more authorized users associated with the card identifier comprises comparing a hash value of the identification of the user to a hash value of the identification of the one or more authorized users associated with the card identifier.

6. The system of claim 1, wherein the authorization request includes a pattern of physical actions performed on the physical computing card, and wherein the operations further comprise:
   determining that the pattern of physical actions matches a predetermined pattern of physical actions corresponding to an authorization of the pending transaction, wherein the sending the transaction authorization is performed further in response to the determining that the pattern of physical actions matches the predetermined pattern of physical actions.

7. The system of claim 6, wherein the pattern of physical actions comprises one or more taps on the physical computing card.

8. The system of claim 1, wherein the authorization request is received from a proxy device associated with the physical computing card.

9. The system of claim 6, wherein the pattern of physical actions comprises a clockwise or counterclockwise finger movement over a finger sensor of the physical computing card.

10. The system of claim 6, wherein the pattern of physical actions comprises a series of pinches, and wherein each pinch of the series of pinches has a measured time duration included in the pattern of physical actions.

11. A method comprising:
    receiving, over a network connection from a physical computing card, an authorization request, wherein the authorization request includes a card identifier and a location from which the authorization request was sent;
    determining one or more authorized users associated with the card identifier;
    obtaining, from a server associated with a point-of-sale device a code scanned from a screen of a user device of a user involved in a pending transaction with the point-of-sale device;
    based on the code scanned from the screen of the user device and obtained from the server associated with the point-of-sale device, determining an identification of the user;
    verifying that an identification of the user matches an identification of one or more authorized users associated with the card identifier;
    verifying that there is a match between the location from which the authorization request was received from the physical computing card and a location of the point-of-sale device where the code was scanned from the screen of the user device; and
    authorizing an entity device located at the entity location and associated with the user to proceed with conducting an activity associated with the pending transaction.

12. The method of claim 11, wherein the authorization request includes a pattern of physical actions performed on the physical computing card, and wherein the method further comprises:
    determining that the pattern of physical actions matches a predetermined pattern of physical actions corresponding to an authorization of the pending transaction, wherein the authorizing is performed in response to the determining that the pattern of physical actions matches the predetermined pattern of physical actions.

13. The method of claim 12, wherein the pattern of physical actions comprises a clockwise or counterclockwise finger movement on a sensor of the physical computing card.

14. The method of claim 12, wherein the pattern of physical actions comprises a series of taps on a sensor of the physical computing card.

15. The method of claim 12, wherein the pattern of physical actions comprises a series of pinches applied to the physical computing card, wherein each pinch of the series of pinches has a measured force pressure applied in the pinch, and wherein the measured force pressure applied in the pinch is included in the pattern of physical actions.

16. A non-transitory machine-readable medium having stored thereon machine-readable instructions executable to cause a machine to perform operations comprising:
    receiving, over a network connection from a physical computing card, an authorization request, wherein the authorization request includes a card identifier and a location from which the authorization request was sent;
    determining one or more authorized users associated with the card identifier;
    obtaining from a server associated with a point-of-sale device a code scanned from a screen of a user device of a user involved in a pending transaction with the point-of-sale device;
    based on the code scanned from the screen of the user device and obtained from the server associated with the point-of-sale device, determining an identification of the user;
    verifying that the identification of the user matches an identification of the one or more authorized users associated with the card identifier;
    verifying that there is a match between the location from which the authorization request was received from the physical computing card and a location of the point-of-sale device where the code was scanned from the screen of the user device;
    sending, over the network connection, an authorization grant to the server, wherein the authorization grant authorizes the point-of-sale device to conduct the pending transaction for the user.

17. The non-transitory machine-readable medium of claim 16, wherein the server associated with the point-of-sale device is further associated with an issuer of the physical computing card.

18. The non-transitory machine-readable medium of claim 16, wherein the identification of the one or more authorized users comprises a tokenized identity.

19. The non-transitory machine-readable medium of claim 16, wherein the authorization request includes a pattern of physical touches performed on the physical computing card, and wherein the operations further comprise:
  determining that the pattern of physical touches corresponds to a predetermined pattern of physical touches, wherein the sending the authorization grant is performed in response to the determining that the pattern of physical touches corresponds to the predetermined pattern of physical touches.

20. The non-transitory machine-readable medium of claim 19, wherein the pattern of physical touches includes a time duration and a force pressure for each touch of the physical touches.

* * * * *